United States Patent
Minemier

(10) Patent No.: US 7,126,631 B1
(45) Date of Patent: Oct. 24, 2006

(54) SENSING WITH DEFECTIVE CELL DETECTION

(75) Inventor: Ronald K. Minemier, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/345,669

(22) Filed: Jun. 30, 1999

(51) Int. Cl.
H04N 9/64 (2006.01)
H04N 17/00 (2006.01)
H04N 1/46 (2006.01)

(52) U.S. Cl. .............. 348/246; 348/247; 348/187; 358/504

(58) Field of Classification Search ............. 348/147, 348/175, 246, 247
See application file for complete search history.

(56) References Cited

U.S. PATENT DOCUMENTS

| | | | | |
|---|---|---|---|---|
| 4,523,231 A | * | 6/1985 | Therrien | 348/187 |
| 4,805,023 A | * | 2/1989 | Younse et al. | 348/247 |
| 5,185,883 A | * | 2/1993 | Ianni et al. | 348/247 |
| 5,416,516 A | * | 5/1995 | Kameyama et al. | 348/246 |
| 5,436,659 A | * | 7/1995 | Vincent | 348/246 |
| 5,497,381 A | * | 3/1996 | O'Donoghue et al. | 714/745 |
| 5,963,654 A | * | 10/1999 | Prakash et al. | 382/112 |
| 5,991,699 A | * | 11/1999 | Kulkarni et al. | 702/83 |
| 6,035,072 A | * | 3/2000 | Read | 382/275 |
| 6,293,465 B1 | * | 9/2001 | Heller et al. | 235/454 |
| 6,340,989 B1 | * | 1/2002 | Oda | 348/246 |
| 6,593,961 B1 | * | 7/2003 | Perino | 348/187 |
| 6,611,288 B1 | * | 8/2003 | Fossum et al. | 348/246 |
| 6,819,358 B1 | * | 11/2004 | Kagle et al. | 348/246 |

* cited by examiner

Primary Examiner—David Ometz
Assistant Examiner—Nhan T Tran
(74) Attorney, Agent, or Firm—Trop, Pruner & Hu, P.C.

(57) ABSTRACT

An image sensor may have on-board circuits for detecting defective pixels. In one embodiment of the present invention, high and low values may be determined for pixel intensities. Those pixels that produce intensity values that fall above or below these high and low values respectively, may be determined to be defective during the pixel readout process. In addition, spatial defects may be determined for rows and/or columns. By determining point and/or spatial defects during the pixel readout process, for example using circuitry containing on the image sensor itself, significant economies may achieved in the pixel manufacturing process.

27 Claims, 10 Drawing Sheets

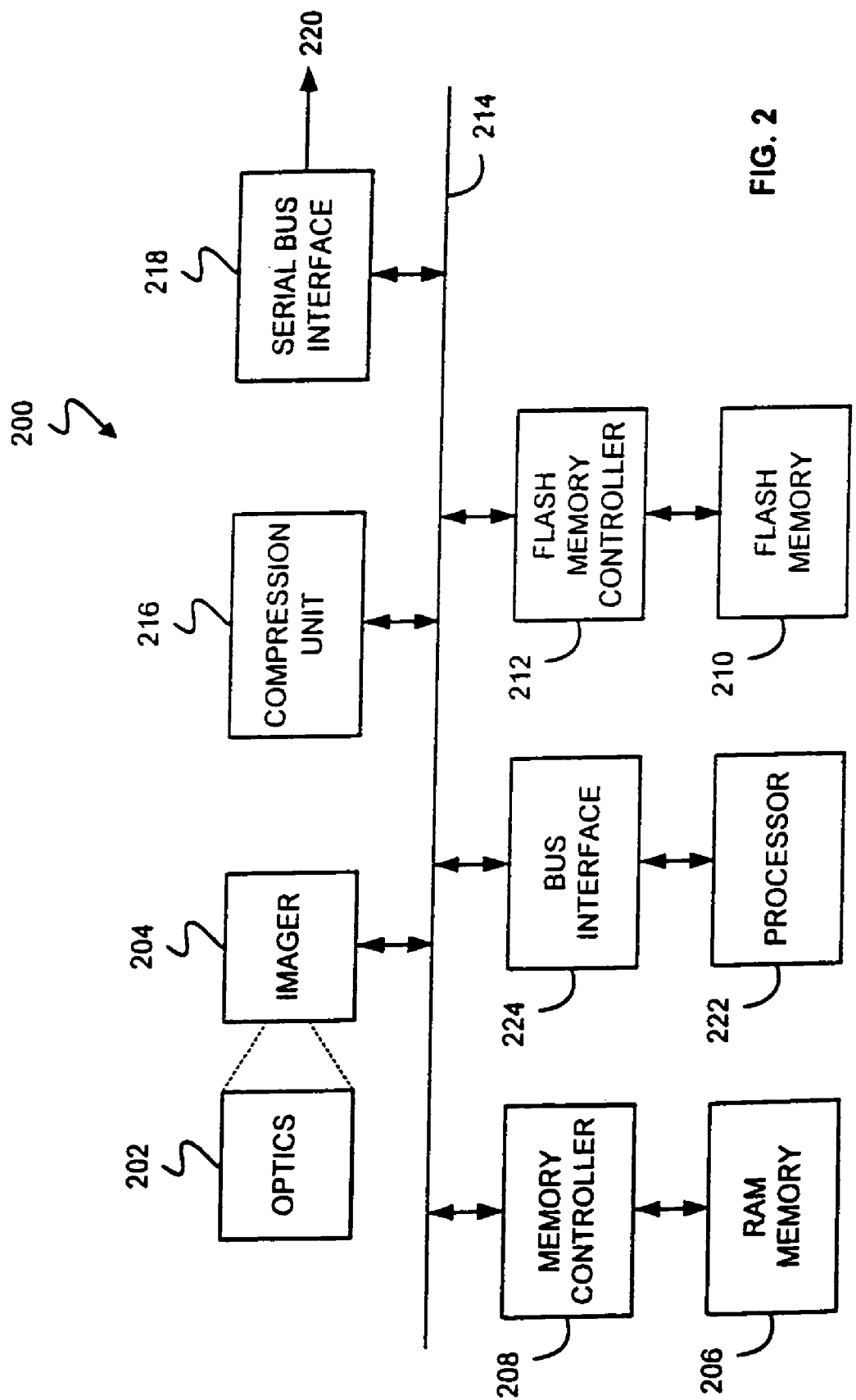

SENSING WITH DEFECTIVE CELL DETECTION

BACKGROUND

This invention relates generally to detecting defective cells in sensors including image sensors used in digital cameras, scanners and other electronic devices.

Referring to FIG. 1, a common digital image processing system includes a camera 100, a computer 102 coupled to the camera 100 by a communication link 104, and a display unit 106. The communication link 104 may be a serial bus such as the universal serial bus (USB). The display unit 106 may be any convenient display device such as a cathode ray tube (CRT) or liquid crystal display (LCD).

The camera 100 may use the imager 108 to generate an electrical representation of an optical image 110. To accomplish this, the imager 108 may include a sensor having an array of photon sensing elements. During an integration time or interval, each sensor element accumulates light energy from that portion of optical image 110 that is focused on it by camera 100 optics (not shown in FIG. 1). At the expiration of the integration interval, sensor elements indicate the intensity of the received light energy by, for example, an analog voltage signal. Camera 100 typically processes the indications from sensor elements to form a frame of digital data which may then be stored in memory internal to the camera 100 (not shown in FIG. 1), and/or transferred to the computer 102.

Image sensors are subject to defective pixels. However, because of the large number of pixels in image sensors, the fact that a few pixels are defective may not mean that the image sensor must be discarded. Instead, different manufacturers have quality standards which dictate that when the number of defective pixels exceeds a given number, then and only then, must the image sensor be discarded. These defective pixel numbers generally correspond to a number which adversely affects the quality of the image captured by the image sensor.

Generally, the pixel output signal is in the form of an intensity indication. A tester may determine whether the indicated pixel levels correspond to the expected intensities of the pixel. If not the pixel may be judged to be defective.

In addition to pixels that are deemed defective by virtue of their indicated intensity values, another type of defect which may affect the quality of an image sensor is a spatial defect. Basically, spatial defects are defects that arise due to the close proximity of two defective pixels. If two defective pixels are sufficiently close to one another, their combined effect may be additive. Thus, in addition to counting actually defective pixels, many image sensors are analyzed based on spatial defects. When the number of spatial defects and the number of pixel defects exceed a desired maximum, the image sensor may be considered unsuitable and may be discarded.

Image sensor test systems may capture a frame and then algorithmically determine which pixels are defective. The test system may be plugged into the image sensor. Generally the test system needs sufficient memory to hold and analyze the captured frame. Thus, the testers utilized for testing image sensors tend to be expensive. In addition, these testers consume algorithmic processing time. This algorithmic processing time is a function not only of the actual processing time but also the time needed to transfer the image data from the image sensor to the tester for external analysis. In addition, the transfer process itself may introduce noise which may further reduce the quality of the test results.

Thus, there is a continuing need for improved ways of testing sensors for defective sensing elements.

SUMMARY

In accordance with one aspect, a method of detecting defective sensing element arrays includes reading out a frame of sensing element data from an array. The number of defective elements is determined by analyzing the data during the frame read out.

BRIEF DESCRIPTION OF THE DRAWINGS

FIG. 2 shows a digital camera in accordance with one embodiment of the invention;

DETAILED DESCRIPTION

Figure 1:
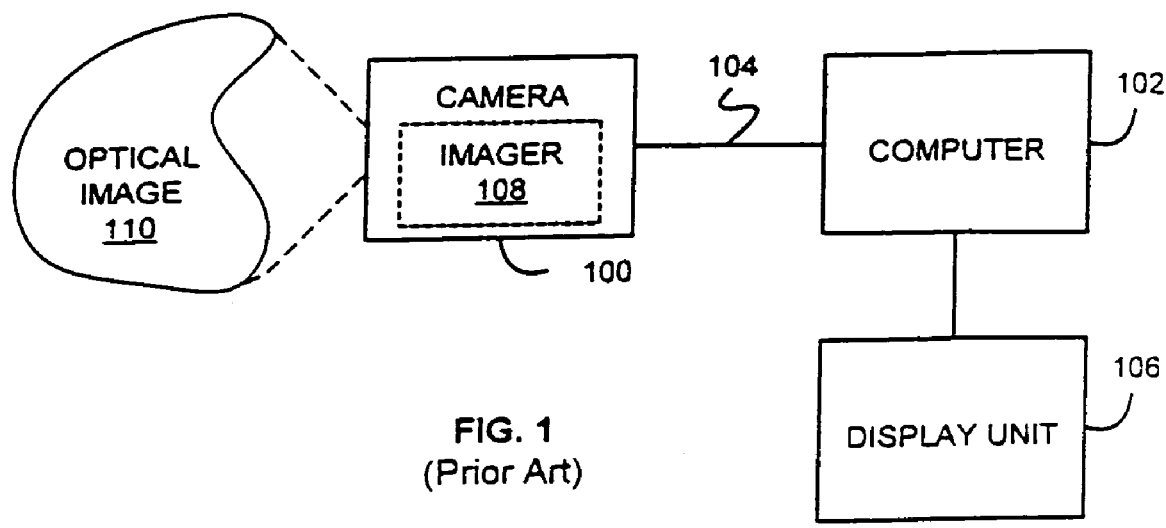
FIG. 1 shows a prior art digital imaging system.

While the following embodiments of this inventive concept are described in terms of a portable personal computer (PC) camera; they are illustrative only and are not to be considered limiting in any respect. The present invention is also applicable to image sensors used in devices other than cameras such as scanners but may also be applied to any sensing device using a large array of elements to be tested (e.g. biometric fingerprint sensors, etc.).

Referring to FIG. 2, a digital portable PC camera 200 in accordance with one embodiment of the invention may include optics unit 202 to focus an optical image onto the focal plane of imager 204. Image data (e.g., frames) generated by imager 204 may be transferred to a random access memory (RAM) 206 (through memory controller 208) or flash memory 210 (through memory controller 212) via the bus 214. In one embodiment of the invention, RAM 206 is a nonvolatile memory.

The camera 200 may also include a compression unit 216 that interacts with the imager 204 to compress the size of a generated frame before storing it in a camera memory (RAM 206 and/or flash memory 210). To transfer a frame of data to a computer, the camera 200 may include a serial bus interface 218 to couple the camera memory (RAM 206 and flash memory 210) to a serial bus 220. One illustrative serial bus is the universal serial bus (USB).

The camera 200 may also include a processor 222 coupled to a bus 214 via a bus interface unit 224. In some embodiments, the processor 222 interacts with the imager 204 to adjust image capture parameters.

Figure 3:
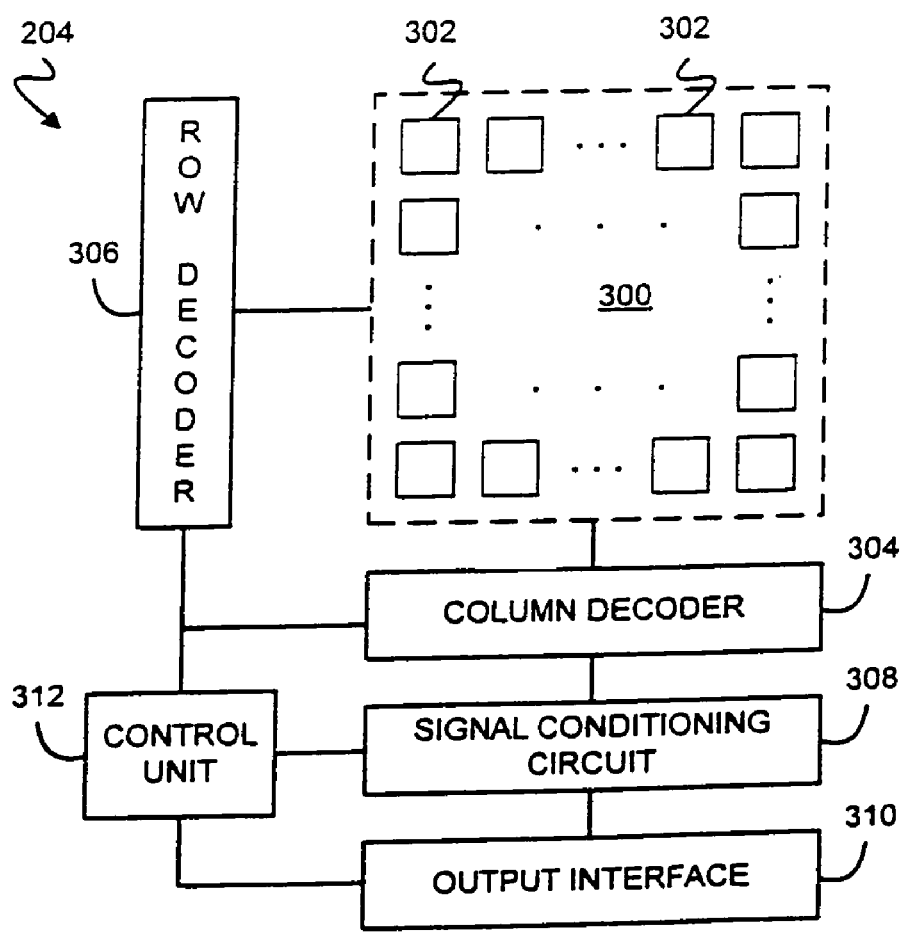
FIG. 3 shows one embodiment of the imager of FIG. 2.

Referring to FIG. 3, the imager 204 may include a rectangular grid or array 300 of pixel sensors 302. This arrangement allows column and row decoders, 304 and 306 respectively, to selectively retrieve indications from the sensors 302. In one embodiment, the sensor array 300 is a 768×576 array of complementary metal oxide semiconductor (CMOS) active pixel sensors. Other embodiments may be used with charge coupled device (CCD) sensors. Still other embodiments may be used with capacitive arrayed elements.

Decoders 304 and 306 route the selected indications to a signal conditioning circuit 308 which may, among other functions, amplify and digitize the received signals. The signal conditioning circuit 308 may also furnish the resultant data signals to an output interface 310 which includes circuitry for interfacing the imager 204 to the bus 214. Control unit 312, through circuitry such as state machines and timers, may coordinate and control the scanning (e.g., selection by row and column decoders 306 and 308) of pixel sensor 302 indications, their subsequent processing by signal conditioning circuit 308, and their transmission to other elements of the camera 200 through an output interface 310.

Camera operations may include normal image capture and calibration. During normal image capture, each pixel sensor 302 accumulates light energy from that portion of an image that is focused on it by optics 202 for a period of time referred to as the integration time or interval. At the expiration of the integration interval, pixel sensors 302 indicate the intensity of the received light energy by, for example, an analog voltage signal. Control circuit 312 routes the pixel sensor indications through column and row decoders 304 and 306 to the signal conditioning circuit 308 where they may be amplified and digitized to form a frame—digital data signals representing the captured image. A frame may be compressed by compression unit 216 and transmitted to memory (e.g., RAM memory 206 or flash memory 210), and/or a computer system via the serial bus interface 218 and serial bus 220.

In general, during calibration camera parameters may be set. Example parameters include pixel sensor integration time, pixel sensor signal gain, and illuminant determination. Calibration may include taking measurements and making settings both in the camera manufacturing facility and during normal use of the camera.

Figure 4:
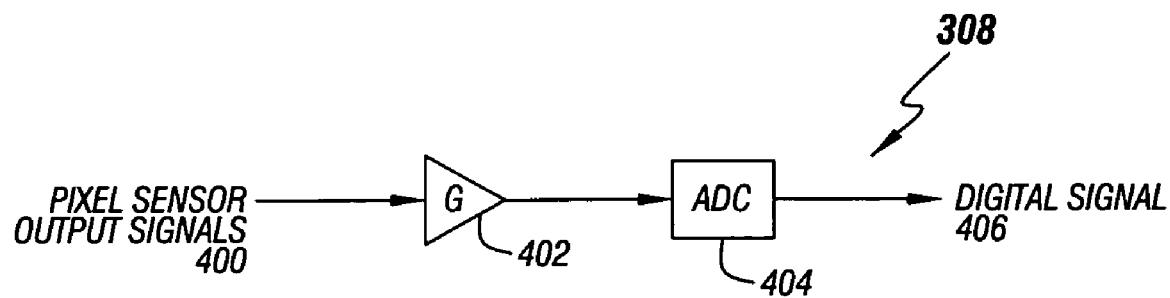
FIG. 4 shows one embodiment of the signal conditioning unit of FIG. 3.

Referring to FIG. 4, a pixel sensor output signal 400 may be amplified (by one or more gain units 402) and digitized (by one or more analog to digital converters 404) by signal conditioning circuit 308 to generate a digital signal 406.

Figure 5:
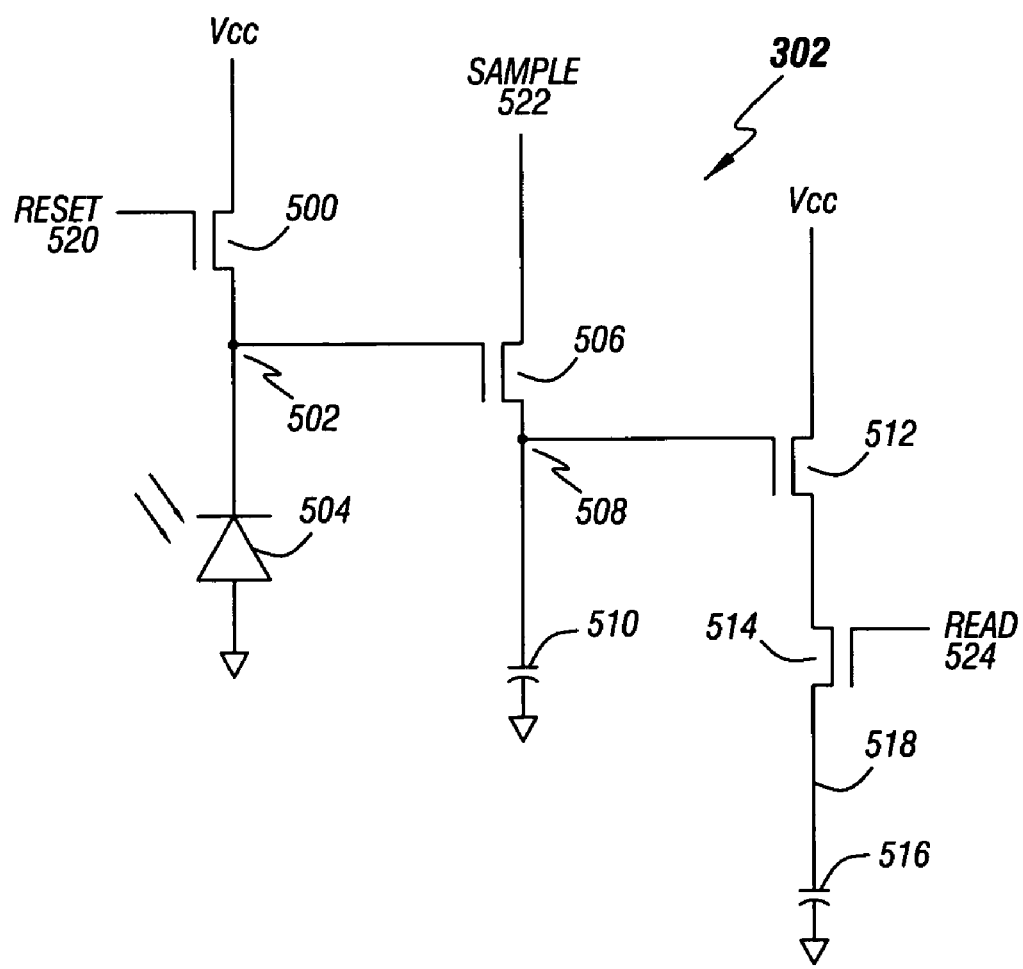
FIG. 5 shows a schematic of an active pixel sensor in accordance with one embodiment of the invention.

Referring to FIG. 5, the pixel sensor 302 may include a transistor 500, a sample node 502, a photosensitive element such as photodiode 504, a transistor 506, a storage node 508, a storage capacitor 510, transistors 512 and 514, output capacitor 516, and an output node 518. Signals RESET 520, SAMPLE 522, and READ 524 control the operation of sensor element 302 and may be generated by control unit 312 as a result of its own operation or at the bequest of, for example, the processor 222. Transistors 500, 506, 512, and 514 may, in one embodiment, be n-channel CMOS field effect transistors. The voltage Vcc may be a positive supply voltage such as, for example, 3.3 volts.

Prior to capturing an image, sample node 502 may be initialized with a positive initialization voltage (Vcc) by briefly asserting (driving high, for example) RESET signal 520. After a specified time, RESET signal 520 is deasserted (driven low, for example) and SAMPLE signal 522 is asserted to initiate pixel sensor 302 integration. Asserting SAMPLE signal 522 activates transistor 506, selectively coupling sample node 502 to storage node 508, allowing storage capacitor 510 to accumulate charge from sample node 502.

To transfer the analog voltage at the storage node 508 (following deassertion of SAMPLE signal 522) to the output node 518, the transistor 514 may be activated by READ signal 524 (READ signal 524 may be generated by row decoder 306). Because the transistor 512 is arranged in a common source configuration, the voltage signal at storage node 508 is coupled to output node 518 when READ signal 524 is asserted (i.e., when transistor 514 is activated).

Figure 6:
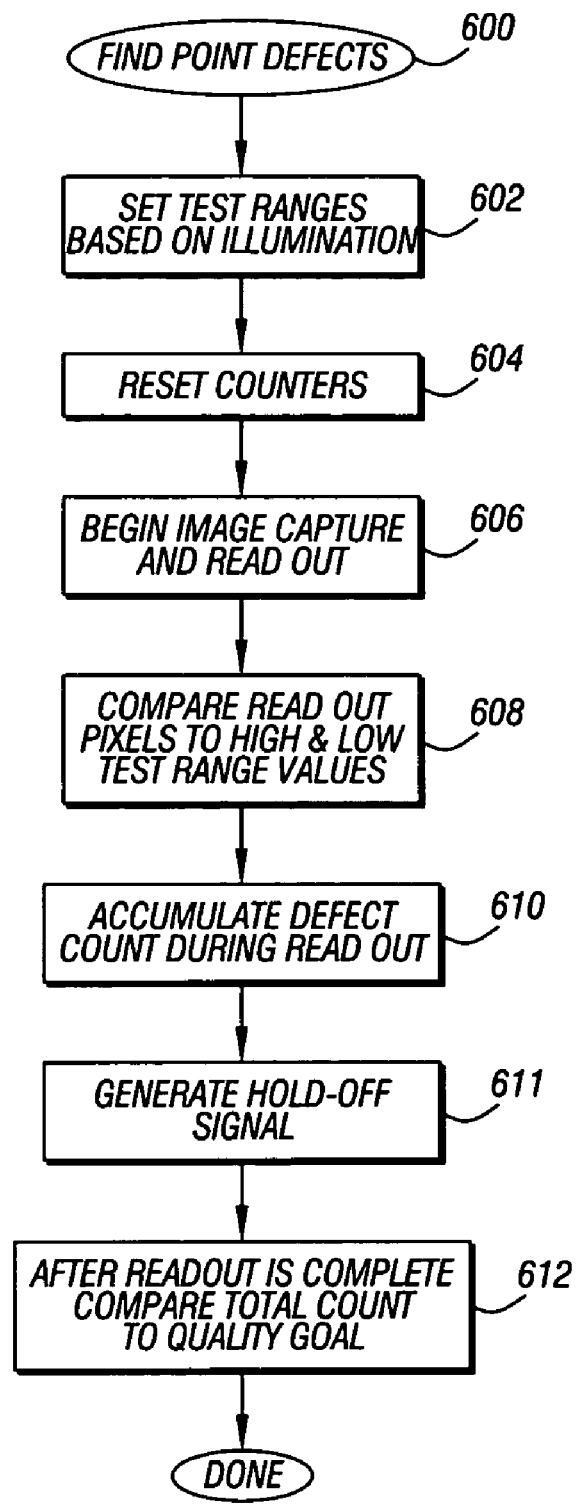
FIG. 6 is a flow which may be implemented by software or hardware, for identifying defective pixels in accordance with one embodiment of the present invention.

Referring to FIG. 6, defective pixels in the array 300 may be identified by using hardware and/or software flow 600. By analyzing the intensities of the output signals produced by each pixel given known illumination, one can determine whether the output signal produced by any given pixel is beyond the range of correct intensities values, thereby indicating that the pixel is defective. Initially, the host computer 102 may configure the sensor for an exposure and frame size to be read out. Then, knowing the illumination conditions, a test limit range of high and low pixel values may be determined as indicated in block 602. Software or hardware counters which count the number of defects may be reset as indicated in block 604. Thereafter the image capture and pixel readout is initiated (block 606).

In the case of a software implementation, the software may be stored, for example, in the flash memory 210 for execution by the processor 222. Alternatively, the software may be stored in association with a processor that may be included as part of the output interface 310, as another example.

As each pixel is readout, its intensity value is compared against the high and low test range values as indicated in block 608. The defect count is accumulated during readout. That is, each time a pixel intensity value is above the maximum or is below the minimum test range values, it is counted as a defect and accumulated in a software or hardware counter (block 610). After the readout is complete, the total count of defective pixels is compared to a quality goal, as indicated in block 612. If the quality goal is exceeded, the sensor may be deemed "defective" and may be discarded or otherwise identified as being of lower quality.

A hold-off signal 611 may be used to gate the defect counter from incrementing. This allows dummy, dark, reference, redundant or other non-desired column data to be excluded from the final defect count. The hold-off signal may be generated by the internal readout logic of the sensor and/or by a control bit in a control register in the sensor. This extra signal allows flexible testing of all parts of the array under a variety of illumination conditions, including complete darkness.

Figure 7:
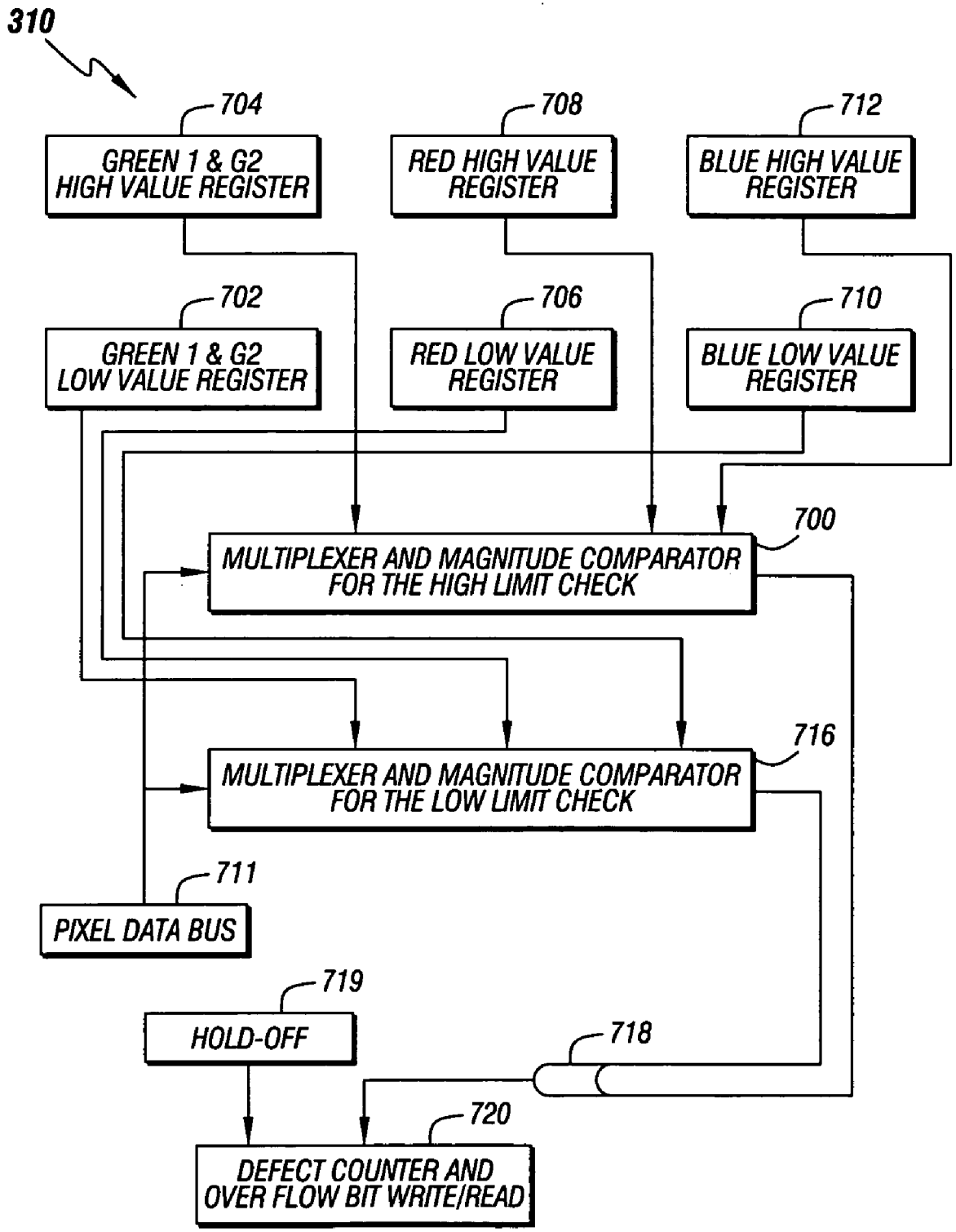
FIG. 7 is a schematic depiction of hardware for detecting defective pixels in accordance with the embodiment of the present invention shown in FIG. 6.

A hardware implementation of the flow illustrated in FIG. 6, shown in FIG. 7, may be implemented for example as part of the output interface 310 in one embodiment of the invention. A pair of multiplexers and magnitude comparators 700 and 716 may be used to check pixel values against pre-set ranges. The comparator 700 checks for the high test range violation and the comparator 716 may check for the low test range violation. Data from the signal conditioning circuit 308 may be provided along the data bus 711 to both the high limit check and low limit check comparators 700 and 716. The comparators may be full adders in one embodiment of the present invention.

The magnitude comparators 700, 716 may form a window circuit. Any pixel value above or below a programmed threshold of the magnitude comparator 700, 716 results in a counting pulse from one of the comparators. The comparators have their trigger output lines logically tied together to generate a final count pulse for each color channel. Thus, each set of comparators 700 and 716 are coupled to an OR logic circuit 718 which in turn is coupled to a defect counter 720. The defect counter 720 is further controlled by a hold-off signal 719 as described previously.

The comparators 700 and 716 are coupled to a bank of registers 702, 704, 706, 708, 710 and 712 which have been programmed with high and low pixel values for the given illumination conditions. In other words, the host computer 102, in one embodiment of the present invention, may programmably set the values in the registers which serve as high and low violation levels for the comparators 700 and 716. A pair of registers are used for each color channel. Thus, in a conventional red, green, blue (RGB) system, six registers may be provided. In a system with two green planes (Green 1 and Green 2), separate or, as illustrated, combined registers may be utilized for the pair of green color channels. The bit width the registers 702–712 may be determined by the analog to digital conversion width of the imaging sensor 108 itself.

The register values in the registers 702–712 may be multiplexed to the comparators 700 and 716. The digital counter 720 may be incremented based on whether either magnitude comparator 700, 716 for the channel in use has crossed its threshold. The counter 720 may be arranged to be readable through the system's parallel or serial interfaces. The width of the counter may be determined by production based test limits. The counter may also have an overflow bit to detect more massive defect conditions. Sequencing circuits in the registers 702–716 determine which set of register values are sent to the magnitude comparators 700, 716.

Figure 8:
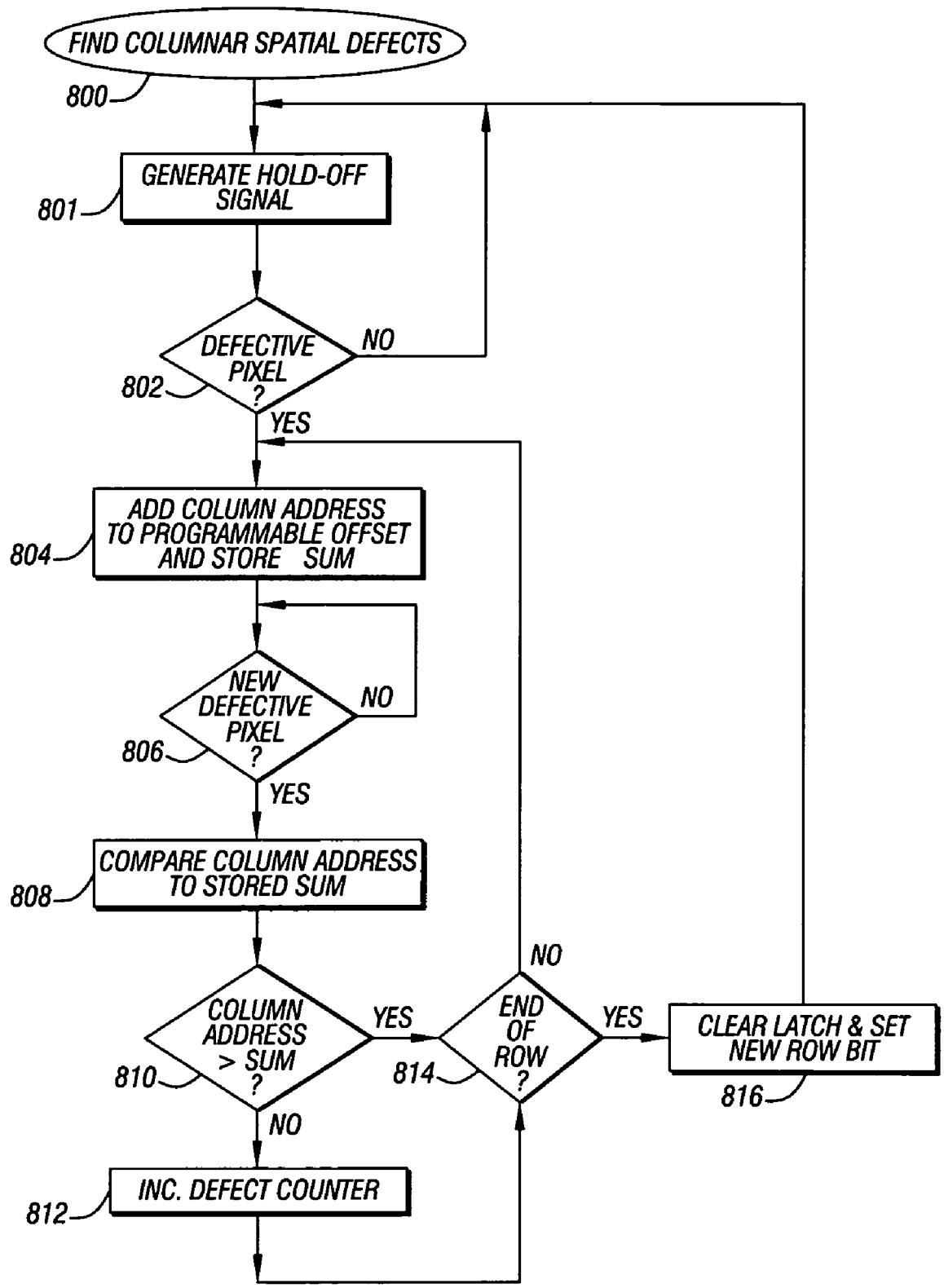
FIG. 8 is a flow which may be implemented by software or hardware, for identifying columnar spatial defects in an image sensor in accordance with the embodiment of the present invention shown in FIG. 7.

A flow 800 for detecting columnar spatial defects, shown in FIG. 8, which may be implemented by software or hardware, begins by receiving a defective pixel indication as indicated at diamond 802. A defective pixel identification may come from the systems illustrated in FIGS. 6 and 7 for example. When a defective pixel is detected, its column address plus a programmable offset of that address are stored as a sum as indicated in block 804. During the remainder of the current row readout, the next defect detected (diamond 806) is compared to the previous defective column address plus the allowed spatial offset (block 808).

The programmable offset may be set by the computer system 102 based on considerations, such as the intended application or field of use of the image sensor, and the manufacturer's or sensor owner's quality standards. Thus, as indicated in diamond 806, upon detection of the next defective pixel in the same row, its column address is compared to the stored sum as indicated in block 808. If the column address of the new defective pixel is greater than the sum stored in block 804 (diamond 810), there is no spatial defect and the flow returns to block 804 where the new address is added to the programmable offset to establish a new sum. At diamond 814, a check determines whether the end of the row has been reached. If not, the flow continues to recycle.

If the second defect has a spacing less than or equal to the programmable offset, as determined at diamond 810, then a software or hardware spatial defect counter may be incremented (block 812). If all the pixels in the row have not been read out (diamond 814), the second defective pixel's column address is then stored with the programmable offset (block 804). This process repeats itself across the full row as it is read out.

When a new row is read out, the sum of the stored address and offset is cleared and a new row bit is set (block 816). The new row bit may be used to prevent previous column defects from affecting the count in a new row being readout. In addition, a hold-off signal 801 may also be used to further control the defect count as described previously.

Figure 9:
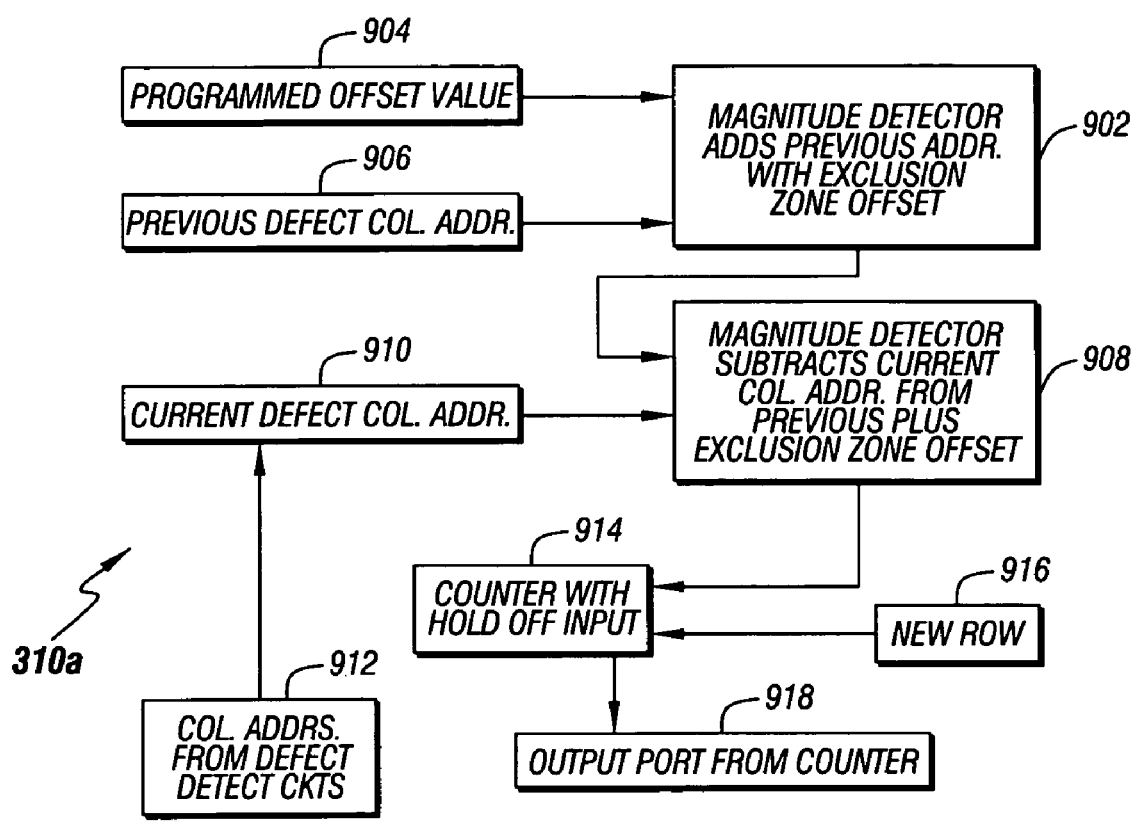
FIG. 9 is a schematic depiction of hardware for implementing one embodiment of the present invention shown in FIG. 8.

Referring now to FIG. 9, a hardware implementation for the flow illustrated in FIG. 8 may be incorporated into a modified output interface circuit 310a. It may be included together with the circuitry illustrated in FIG. 7 in one embodiment of the present invention. A magnitude detector or comparator 902 adds the previous defective column address to the programmable offset value to form an exclusion address range. In one embodiment of the present invention, the detector 902 may be a full adder. An additional magnitude detector or comparator 908 may be used to subtract the next or current defective pixel column address from the sum of the previous defective column address plus the programmable offset value.

A programmable offset value is stored in the register 904 for the column spacing limit. The previous defective column address is latched in the register 906 and the current defective column address may be latched in the register 910. The current defect address is received from the port 912 which may be coupled to the counter 720 of FIG. 7.

The output signal from the comparator 908 is coupled to a counter 914 which counts the columnar spatial defects. A register 916 holds a new row bit. The output signal from the counter 914 is provided to the processor 222 through an output port 918 coupled to the bus 214.

When a defective pixel is detected, the column address plus the programmable offset are stored in the column address register 906. The next defect detected in the same row is compared to the previous defect column address plus the allowed offset. If the magnitude of the second defect's address is greater than the spatial offset, then the new address is latched in the register 906. If the second defect's address is less than or equal to the spatial offset, then the spatial defect count is incremented, and the second defect's column address is latched.

When a new row is read out, the address latch is cleared and a new row bit is set. This bit gates off the trigger line to the counter so that previous columnar defects do not affect the count of defects in the new row.

Figure 10:
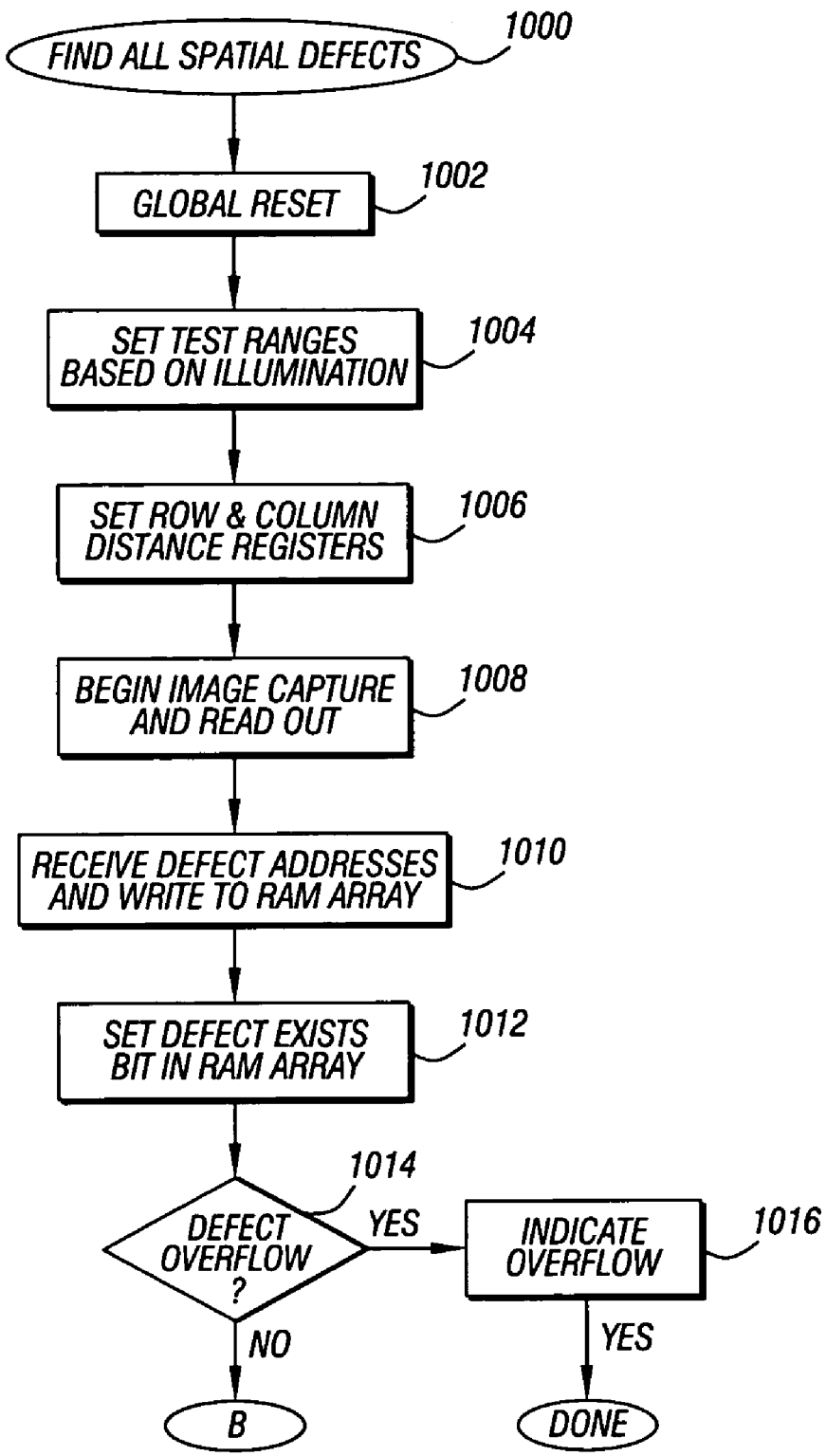
FIG. 10 is a flow which may be implemented in software or hardware, for locating defective pixels and row and column based spatial defects in accordance with one embodiment of the present invention.

Referring next to FIG. 10, a flow 1000, which may be implemented in software or hardware, may be used to analyze row and column based spatial defects. The flow begins by globally resetting registers as indicated in block 1002. After the host computer has configured the sensor for an exposure and frame size to be read out, the host programs the "not allowed" row and column distance registers for the detected illumination conditions (block 1004). This sets the amount of spatial distance which will be detected as spatial row or column defects (block 1006).

As indicated in block 1008, the image capture is begun and the pixel values are readout. During the frame readout, the defective pixel detect circuits 310 detect defects and write their row and column addresses into a random access memory (RAM) array. The circuits 310 also set the defect exists bit in the RAM array as indicated in blocks 1010 and 1012. After the frame has been readout, a defect counter checks for an overflow condition (diamond 1014). That is, a determination is made as to whether the number of single point defects exceeds an allowed count. If so a defect overflow is indicated (block 1016). If the allowed single point defect is not zero and the overflow bit is not set, then the RAM array is checked to determine if any of the single point defects violate the spatial defect criteria for the sensor.

Figure 11:
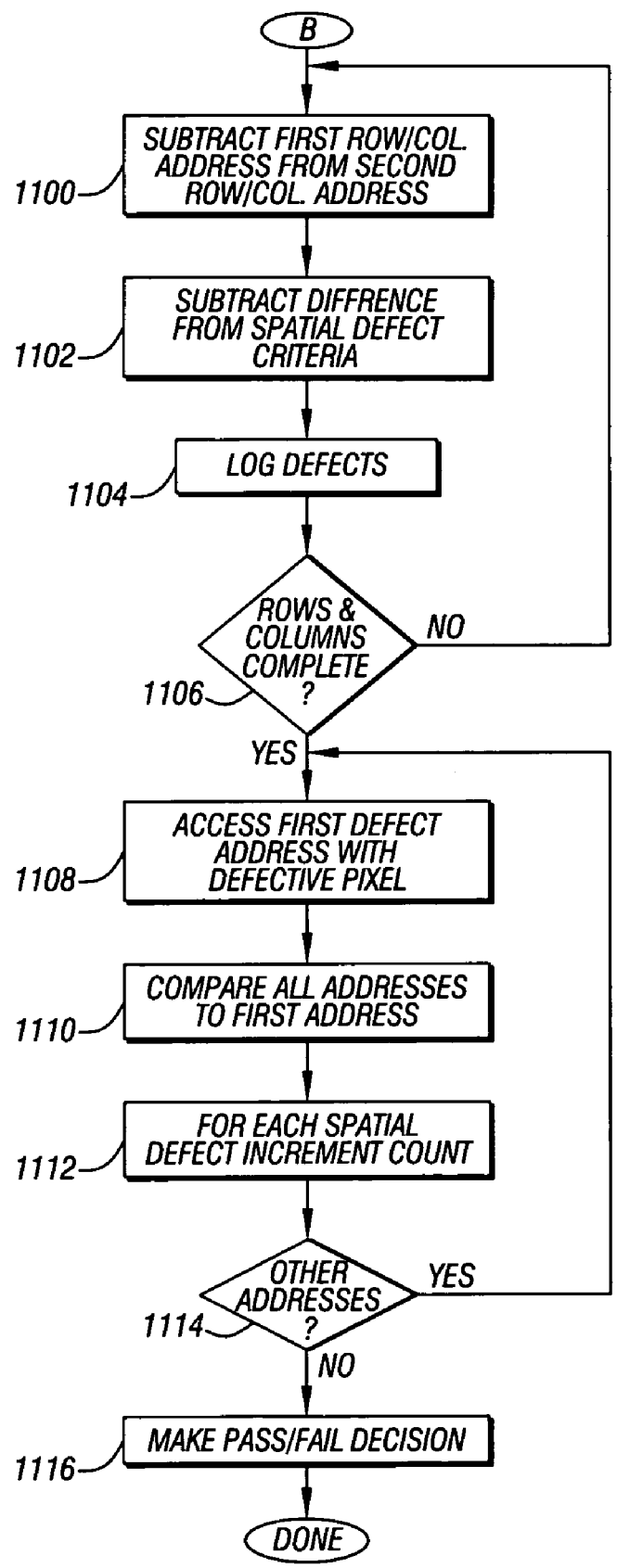
FIG. 11 is a continuation of FIG. 10.

Continuing in FIG. 11, a magnitude comparison may be used to detect defects. Each comparator subtracts a first row address against the second row address (block 1100). The resulting row address is subtracted from the proscribed spatial offset (block 1102). A spatial defect is indicated, if appropriate, in block 1104. A counter is used to log the individual defects. The same comparison is then done for the column addresses (diamond 1106).

The first defect address where a defect exists bit is set is accessed in the RAM array (block 1108). Then all other addresses are compared against the first address to detect spatial defects (block 1110). For RAM addresses where the defect exists bit is cleared, a signal may be generated to avoid counting any miscompares of either the row or column addresses. If a true spatial defect is detected in either a row or column, then a counter is caused to generate an event (block 1112). After the first address has been compared against all other addresses, then the next defect address may be stored and the compare and RAM array readout process is repeated (diamond 1114). This compare process may be repeated until all the addresses that have defect exists bits are compared. When the full RAM array has been checked, the process stops and the user checks the counter contents to make the pass fail decision for the imaging sensor (block 1116).

Figure 12:
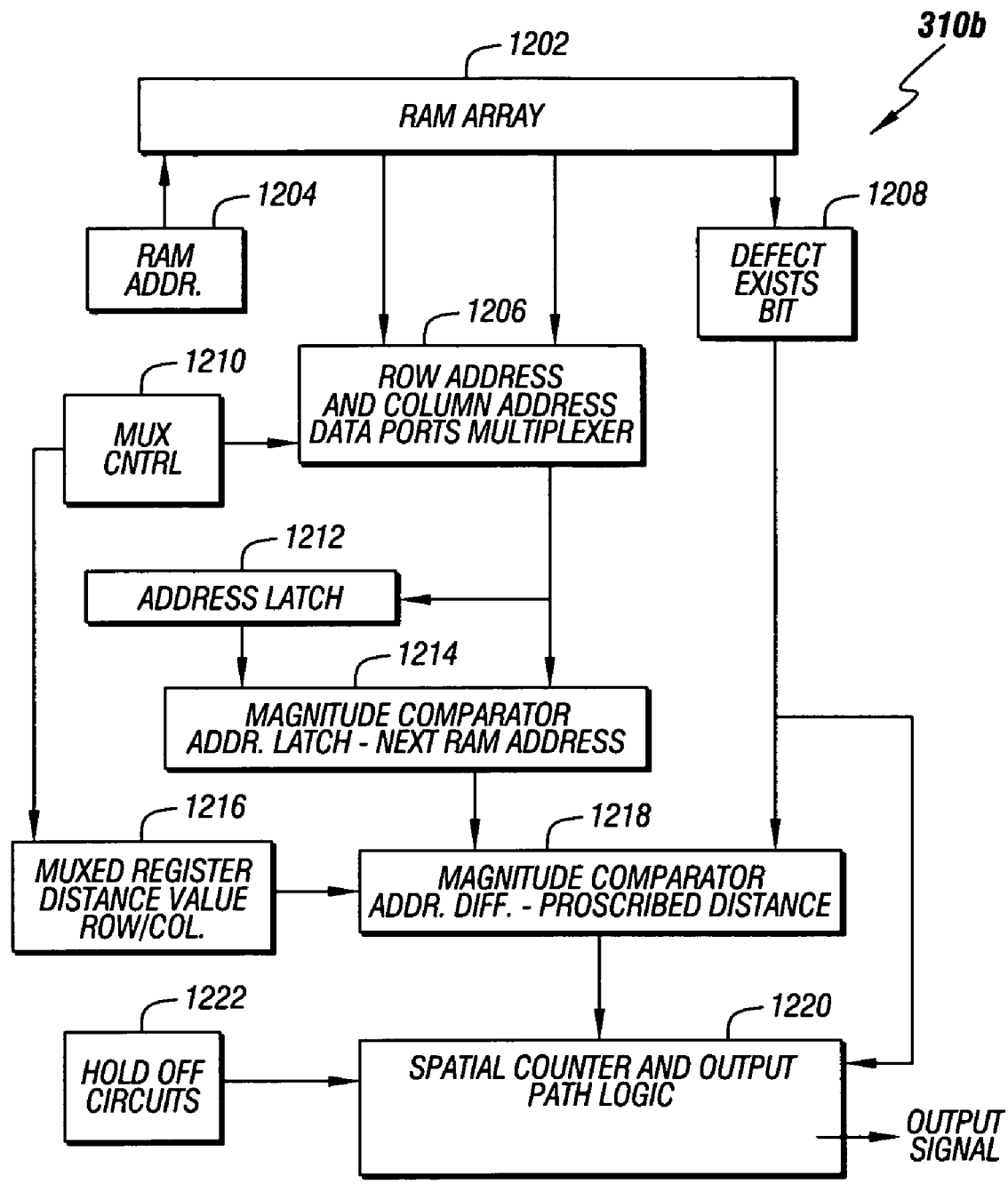
FIG. 12 is a schematic depiction of hardware for implementing one embodiment of the present invention shown in FIGS. 10 and 11.

Referring to FIG. 12, a RAM array 1202 may be provided in a modified output interface circuit 310b to store the row and column defect information. The depth of the array may be determined by the total single defect criteria for the device being tested. The width of the array may be determined by the full row and column address widths, plus one extra bit to signify that a location holds a defect. For example, if the total allowed single point defect count is 128, and the pixel array is 1024 columns by 1024 rows, then the RAM array may be 11 bits wide by 128 locations deep.

A multiplexer 1206 reads the RAM array 1202 after frame readout has been concluded. Each RAM location with a valid defect may have its row and column addresses compared to all of the RAM locations that have an actual defect address stored in them. If enough pins exist on the die to be multiplexed and used as the address for the RAM array, then a tester can do the read sequencing of the RAM array. This saves the additional state machine logic to read out the RAM array. In this example, if a 10 bit analog to digital converter output port exists for the pixel, then after frame readout, these pins may be the entry point to the RAM array's 7 bit addressing.

A register 1216 stores the proscribed row and column distances that may constitute spatial defects, that is, whether there are two single point defects closer than X rows or Y columns apart. A latch 1212 holds the row and column address of the first defect location to be compared against all others. The latch 1212 is fed successive addresses by the multiplexer 1200 until all defect addresses have been compared by the comparators 1214 and 1218 against all other defect addresses.

A global reset in a hardware embodiment clears the defect exists bits in the RAM address array 1202. It may not be necessary to actually clear the RAM address locations as they may be ignored during later compare processes if the defected exists bit is not set.

Two magnitude comparators 1214 and 1218 may detect defects and thereafter may be switched to act as magnitude comparators for the row and column addresses. Each comparator may be multiplexed a second time. The comparator 1214 subtracts the first row address from the second row address while the comparator 1218 subtracts the resulting row address difference from the proscribed distance and signals a spatial defect output signal as appropriate. The comparators are then switched to do the same process on the column addresses. The counter 1220 used to log individual defects in the embodiment of FIG. 7 may now be used to log spatial defects.

The first defect address where the defect exists bit is set may be latched and then all other addresses may be compared against the first address. The sequencing of data from the RAM array through the multiplexer 1206 and from the register 1216 is controlled by the multiplexer controller 1210 and the address decoder 1204. The defect exists bit may be separately read out through the multiplexer 1208 and passed directly to the comparator 1218. For RAM addresses where the defect exists bit is cleared, a hold off signal may be fed by a circuit 1222 to the trigger circuit of the counter 1220 to prevent any miscompares of either the row or column addresses.

If a true spatial defect is detected, in either a row or a column, then a trigger to the counter 1220 is generated. After the first address has been compared against all other addresses, the next defect address is loaded into the defect address latch 1212 and then the compare and RAM array readout processes are repeated. This compare process is repeated until all addresses that have defect exists bits are compared. The address decoder 1204 to the RAM array may be arranged to simply rollover so that it always checks all locations regardless of what address on the RAM array is being checked against all other addresses. After the full RAM array has been checked, the process stops and the user checks the counter contents to make the proper pass/fail decisions.

By detecting defective pixels in known programmable row and column spatial relationships in the image sensor itself during the sensor's normal capture frame readout process, the test system may be relieved of capturing a frame and then algorithmically determining spatial relationships. Thus, embodiments of the present invention save manufacturing cost by reducing memory needed to hold the captured frame, allowing inexpensive testers to be used. Manufacturing costs may be further reduced in some embodiments of the present invention by eliminating algorithmic processing time compared to saving the data to an array in the tester and then determining which pixels are spatially defective.

In one embodiment of the present invention, the defect detection circuits may be located on the same die as the imaging sensor. In other embodiments, they may be located on different die all in the same focal plane.

Various changes in the materials, components, circuit elements, as well as in the details of the illustrated operational method are possible without departing from the scope of the claims. For instance, elements of the illustrative camera of FIG. 2 may be embodied in discrete logic elements, or combined into one or more application specific integrated circuits (ASIC). Further, the invention is not limited to portable PC cameras, but may be used in any digital imaging system. Storage devices suitable for tangibly embodying program instructions include all forms of non-volatile memory including, but not limited to: semiconductor memory devices such as non-volatile RAM (e.g., memory 206), EPROM, EEPROM, and flash devices (e.g., memory 210); magnetic disks (fixed, floppy, and removable); other magnetic media such as tape; and optical media such as CD-ROM disks.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of detecting defective sensing element arrays comprising:
   reading out a frame of sensing element data from an array; and
   determining a number of spatial defects based on a number of pairs of adjacent defective pixels that are closer than a given offset by analyzing said data during the frame read out.

2. The method of claim 1 wherein said sensing element array is an imaging array, said method further including programmably setting high and low limits for pixel intensity values.

3. The method of claim 2 further including programmably setting said high and low limits based on illumination conditions.

4. The method of claim 2 further including comparing the pixel intensity values measured by said array to said high and low limits.

5. The method of claim 4 further including indicating a defect when a pixel's intensity value is higher than said high limit or lower than said low limit.

6. The method of claim 1 wherein said sensing element array is an imaging array, said method further including identifying in the focal plane of a pixel array, which pixels are defective.

7. The method of claim 1 including determining whether two defective pixels are closer together than a programmable offset.

8. The method of claim 7 further including adding a column or row address where a defect exists to a programmable offset and storing said address with said offset.

9. The method of claim 8 further including comparing the address of a defective pixel to said stored address plus a programmable offset.

10. The method of claim 1 further including identifying the number of spatial defects by column and row by analyzing, in said array, said data.

11. The method of claim 1 further including storing information about the location of defective elements in a memory in said array.

12. The method of claim 11 wherein each element in the array has a corresponding location in the memory and setting a defect exists bit at each memory location where a defective element has been identified.

13. An article comprising a medium that stores software instructions executed by a processor that cause a processor-based system to:
   programmably set high and low limits for pixel intensity values; and
   determine during the read out of pixel intensity values from an array, a number of spatial defects involving a number of pairs of adjacent defective pixels that are closer than a predefined offset by analyzing pixel data from said array in view of said high and low limits for pixel intensity values.

14. The article of claim 13 further storing instructions that cause a processor-based system to programmably set said high and low limits based on illumination conditions.

15. The article of claim 13 further storing instructions that cause a processor-based system to compare the pixel intensity values measured by said array to said high and low limits.

16. The article of claim 13 further storing instructions that cause a processor-based system to determine whether two defective pixels are closer than a programmable offset.

17. The article of claim 13 further storing instructions that cause a processor-based system to identify the number of spatial defects by column and row by analyzing said pixel data.

18. The article of claim 13 further storing instructions that cause a processor-based system to store information in a memory about the location of a defective pixel.

19. A sensing device comprising:
   a plurality of sensing elements capable of indicating data to be captured; and
   a circuit in said device to determine a number of spatial defects based on pairs of adjacent defective pixels that are closer than an offset by analyzing the data as it is read out from said elements.

20. The device of claim 19 wherein said device is an imaging device and said elements are pixels, said device including storage adapted to enable high and low limits for pixel intensity values to be set programmably.

21. The device of claim 19 further including a circuit adapted to determine the number of spatial defects by analyzing data as it is read out from said elements.

22. The device of claim 21 further including a window circuit that is adapted to add a column or row address where a defect exists to a programmable offset and to store said address with said offset.

23. The device of claim 22 further including a comparator adapted to compare the address of a defective element to the stored address plus the programmable offset.

24. The device of claim 19 further including a memory adapted to store information about the location of defective elements.

25. The device of claim 24 wherein said memory includes a location corresponding to each of a plurality of elements.

26. The device of claim 19 wherein said circuit and said elements are formed on the same die.

27. The device of claim 19 wherein said device is an imaging device and said elements are pixels, said circuit being formed on the imaging device's focal plane that includes said pixels.

* * * * *